Patented Apr. 5, 1932

1,852,603

UNITED STATES PATENT OFFICE

GEORGE GLEN BROCKWAY, OF WARREN, PENNSYLVANIA, ASSIGNOR, BY MESNE ASSIGNMENTS, TO NICHOLS ENGINEERING AND RESEARCH CORPORATION, OF NEW YORK, N. Y., A CORPORATION OF DELAWARE

PROCESS OF ACTIVATING OR REVIVIFYING FINELY DIVIDED MATERIALS

No Drawing. Continuation of application Serial No. 290,701, filed July 5, 1928. This application filed October 16, 1928. Serial No. 312,938.

This invention relates to methods or processes of activating or revivifying finely divided materials, such for example as natural or activated clay or earth materials used as filtering, decolorizing and purifying agents in the refining of various kinds of animal, vegetable and mineral oils, fats, waxes and greases.

Until recent times petroleum refiners have been treating oils by first distilling and then treating the various fractions with acid, neutralizing with caustic materials, and filtering by percolation through large bodies of coarse fuller's earth, for example either 16-30 or 30-60 mesh. After a certain quantity of oil has been filtered through the percolator, which is usually a large tank containing many tons of coarse mesh earth, a solvent or distillate is run through the percolator to remove the retained oil from the fuller's earth. The fuller's earth is then treated in furnaces to burn out the impurities which have been absorbed by the earth from the oil, so that the earth may be used again. This process is variously termed roasting, burning, reactivating or revivifying.

In the animal and vegetable oil industry the methods employed have included process steps comprising first, caustic refining of the oil to neutralize the free fatty acids, then bleaching and purifying the oil with fine fuller's earth, generally of a 200 mesh. That is, the greater percentage of the earth will pass through a 200 mesh screen. This latter operation is carried out by the so-called contact filtration method, which consists in mixing a small quantity of refined earth with the oil in a tank and agitating the mixture by mechanical means or otherwise, then filtering the oil through any suitable well known type of filter press. The filter press cake, so-called, or earth, which is removed from the filter press, contains usually large percentages of oil by weight of the cake. Heretofore it has been the practice to throw away this earth when the presses are cleaned, no method having been heretofore developed to successfully reactivate such fine earth.

Coarse or granular clays, after being used for filtering, as above stated, may be reactivated according to well known processes by the proper application of heat with admixture of air for the purpose of decarbonizing and destroying the impurities and coloring matter which have been absorbed from the oil. This decarbonizing action is performed after the larger portion of retained oil has been removed from the earth. However, in attempting to reactivate either finely divided natural or treated clays, the particles lie so close together that it is not possible to admit in a proper mixture the amount of air which is necessary for the complete oxidizing or decarbonizing action, and also the particles nearest the source of heat protect the underlying particles so as to prevent the heat and air from properly and uniformly acting.

The objects of this invention include the provision of a dependable, convenient and simple process or method for activating or revivifying finely divided materials of the above indicated character. Further objects, features and advantages will more clearly appear from the detailed description given below and describing by way of example certain embodiments of the invention, the invention consisting in the novel steps and processes hereinafter set forth.

I have discovered a process according to which this finely divided fuller's earth or like materials of from 100 to 200 mesh or finer may be treated to restore therein a degree of efficiency comparable to the results secured in revivifying coarse fuller's earth. According to this process, I preferably first extract the larger portion of the retained oil carried by the filter cake or other material which is to be treated. This may be done by any suitable well known method either mechanically or by the use of solvents. Certain solvents may even be used which will permit recovery of a high grade of oil from this filter cake which has been heretofore thrown away or from which merely oil of low quality has been recoverable. After the retained oil has been thus largely removed, according to my process, I mix with the fuller's earth fines a suitable quantity of coarse material, for example an equal quantity of coarse fuller's earth which has been used in percolation filtering methods, that is, 16-30 mesh or 30-60 mesh earth. It is advantageous to use such so-called granular earth or earth which has been used in percolating processes, since this material is usually readily available at refineries for the reason that the general practice heretofore has been to use the percolation filtering method.

However, it will be understood that in addition to coarse mesh earth, either new or spent, various other materials may be equally well used, either separately or in mixtures, such for example as carefully washed and graded sand, quartz, or carborundum. The granular clay or other coarse material is preferably thoroughly mixed with the finely divided decolorizing material which is to be treated and although the proportions of different kinds of earths may be widely varied, I find that in general substantially equal quantities of the coarse and fine materials may be mixed with satisfactory results as above stated.

This mixture of coarse and fine material is then heated in a properly constructed furnace, preferably of the well known multiple hearth type shown in various patents to Herreshoff and in improvement patents relating to such type. A furnace of this type, having from 8 to 12 or more hearths, has been found to be satisfactory for this purpose. The temperature maintained within the furnace may vary within rather wide limits, but I have found that temperatures from 800° F. to 1150° F. give highly satisfactory results with a relatively low consumption of fuel. The amount of fuel used will of course vary with the degree with which the oil residue has been previously extracted from the filter cake or earth and also with the character and quantity of impurities, particularly impurities embodying carbon, which have been absorbed from the oil. If a considerable amount of oil and carbon impurities remain in the earth, this may serve to provide sufficient fuel or nearly enough fuel to properly maintain the decarbonizing action without introducing additional fuel. The process may be carried on continuously within the furnace, the earth being rabbled over the hearths at a rate such that from in the neighborhood of three to four hours are required for a given body of earth to travel down through the furnace. However, this time may vary widely.

I find that by thus mixing coarse material with the fine earth, the fine particles of material are effectively kept from intimate contact. That is, the particles are kept sufficiently separated so that heat and air may be properly and uniformly applied throughout the body of material when the material is suitably rabbled. With the resulting exposure of all of the fine particles to the heated air, the fine earth is thoroughly decarbonized and the impurities which have been absorbed therein during the filtration of oil, as well as any inherent impurities, are destroyed and the efficiency of the used earth is restored to a degree approaching its initial efficiency. In fact this revivification operation may be repeated a large number of times without any substantial diminution of the efficiency of the earth beyond that occurring during the initial use and treatment thereof.

After the mixture of coarse and fine material is delivered from the furnace, it is preferably passed through a suitable separating device to separate the coarse material from the fine. The fine material is then ready to be reused, and if the coarse material used was granulated fuller's earth or the like material, this also will be revivified and will now be ready for reuse.

Although in the above described example, the process is particularly applied to the treatment of used fine earth, I have discovered that new fine fuller's earth may likewise be treated in a similar manner by mixing the coarse earth with the fines and the result in many cases is a great improvement in the filtering characteristics of such new fines. Such treatment of new fines may be carried out either at the location where the fuller's earth is produced or at the oil refineries. Although all new fine earths apparently do not react uniformly to such treatment, I have found for example that certain so-called "natural acid" fine earths show a quite remarkable improvement under such treatment.

I also find it desirable in many instances to rehydrate the new or used fine earths which have been treated according to the above described process. In the contact method of filtration, moisture generally has a beneficial effect if present in fuller's earth. This is believed to be for the reason that since the oil being treated is maintained at a comparatively high temperature, the steam resulting from the moisture present serves to protect the oil from oxidation during the contacting period. One commercial form of fine fuller's earth, for example, embodies approximately 11% of water of combination and I find that such earth after being treated according to the above described roasting process, is considerably improved by restoring in the neighborhood of 11% of moisture thereto. This may be accomplished in various ways;

for example, the desired amount of water may be added to the earth in bulk or as a spray while the earth is agitated in a mixer, or if this is found to be difficult for mechanical reasons, the oil which is being treated may be emulsified with the proper amount of water.

In reactivating used fine earth even after the larger portion of the oil has been extracted therefrom, there is a tendency for considerable free burning of the remaining oil residue or gases contained therein, particularly on the upper hearths of the furnace. This renders it difficult to control temperatures and to insure proper burning or roasting conditions. However, by mixing the coarse material with the fine earth, I find that this tendency for free burning is reduced substantially to a minimum or entirely avoided. Dust losses are also minimized. By the use of this process there is apparently a very uniform absorption of heat throughout the mass of material which prevents the destruction of the fine earth from causes such as sintering, glazing or fusing, which in the absence of the coarse material will take place at the hearth areas which are more exposed to the source of heat.

This application comprises a continuation of my copending application Serial No. 290,701, filed July 5, 1928.

While the invention has been described in detail with respect to particular preferred examples thereof which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent of the United States is:

1. Method of revivifying or reactivating spent fine filtering, oil decolorizing and purifying materials, which consists in first removing the greater portion of any retained oil therefrom, mixing the material with a substantial quantity of relatively coarser or granular material, then treating the mixture in a furnace to substantially decarbonize the fine material, and finally removing said coarses or granular material from the mixture.

2. Method of revivifying or reactivating spent fine filtering, oil decolorizing and purifying materials, which consists in mixing the material with a substantial quantity of relatively coarser or granular material, then treating the mixture in a furnace to substantially decarbonize the fine material, and finally removing said coarser or granular material from the mixture.

3. Method of revivifying or reactivating spent fine filtering, oil decolorizing and purifying materials, which consists in mixing the material with a substantial quantity of relatively coarser or granular material, and then treating the mixture in a furnace to substantially decarbonize the fine material.

4. Method of revivifying or reactivating spent fine filtering, oil decolorizing and purifying materials, which consists in first removing the greater portion of any retained oil therefrom, mixing the material with a substantial quantity of relatively coarser or granular material, and then treating the mixture in a furnace to substantially decarbonize the fine material.

5. The method of revivifying fine fuller's earth or the like material which has been used in the "contact" process of oil filtration, which comprises mixing therewith approximately an equal quantity of a relatively much coarser material, and then treating the mixture in a furnace to substantially decarbonize the fine material.

6. The method of revivifying fine fuller's earth or the like material which has been used in the "contact" process of oil filtration, which comprises mixing therewith a quantity of granular fuller's earth derived from the percolation process of oil filtration, and then substantially decarbonizing the mixture in a roasting furnace.

7. The method of revivifying fine fuller's earth or the like material which has been used in the "contact" process of oil filtration, which comprises mixing therewith a quantity of granular fuller's earth derived from the percolation process of oil filtration, then substantially decarbonizing the mixture in a roasting furnace, and finally separating the fine and granular earths.

8. The method of revivifying fine fuller's earth or the like material which has been used in the "contact" process of oil filtration, which comprises mixing therewith an approximately equal quantity of granular fuller's earth derived from the percolation process of oil filtration, and then substantially decarbonizing the mixture in a roasting furnace.

9. The process of fuller's earth revivification which comprises roasting a mixture of the fine and granular earths in discreet or separated condition, in the presence of an abundance of air, with agitation.

10. The process of fuller's earth revivification which comprises roasting a mixture of the fine and granular earths, in the presence of an abundance of air, with agitation, and at a temperature in the neighborhood of from 800° F. to 1150° F.

11. The process of fuller's earth revivification which comprises mixing earths derived from "contact" and "percolation" oil filtration processes, roasting the mixture in the presence of an abundance of air, with agitation, and then separating said earths.

12. The process of treating fuller's earth, which comprises roasting a mixture of the relatively fine and granular earths in the presence of an abundance of air with agitation, and at a temperature in the neighborhood of from 800° F. to 1150° F.

13. The process of treating fuller's earth "fines" such as may be used in the "contact" process of oil filtration, which comprises mixing such fine earth with relatively coarser or granular fuller's earth, roasting the mixture in the presence of an abundance of air with agitation, and then separating said earths.

14. Method of treating fine filtering, oil decolorizing, and purifying materials, which comprises mixing the material with a substantial quantity of relatively coarser or granular material, then roasting the mixture in a furnace, removing said coarser or granular material from the mixture, and restoring a quantity of moisture to the fine material.

15. Method of revivifying or reactivating spent fine filtering, oil decolorizing and purifying materials, which consists in first removing the greater portion of any retained oil therefrom, mixing the material with a substantial quantity of relatively coarser or granular material, then treating the mixture in a furnace to substantially decarbonize the fine material, and thereafter uniformly mixing a limited amount of moisture in the material.

16. The process of treating fuller's earth "fines" such as may be used in the "contact" process of oil filtration, which comprises mixing such fine earth with relatively coarser or granular fuller's earth, roasting the mixture in the presence of an abundance of air with agitation, separating said earths, and adding in the neighborhood of 10% of moisture to said "fines."

17. The method of revivifying fine fuller's earth or the like material, which has been used in the "contact" process of oil filtration, which comprises substantially decarbonizing the same while the particles thereof are in dry, discreet or separated condition in a roasting furnace, and then adding and uniformly mixing a quantity of moisture therewith.

18. The method of revivifying fine fuller's earth or the like material which has been used in the "contact" process of oil filtration, which comprises substantially decarbonizing the same while the particles are in dry, discreet or separated condition in a roasting furnace, and then restoring thereto a quantity of moisture at least substantially equal to the amount originally carried by the earth.

19. The process of treating fuller's earth which comprises roasting a mixture of fine earth having a particle size of upwards of 60 mesh with earth having a particle size of upwards of 200 mesh in the presence of an abundance of air, with agitation, and separating the fine particles from the particles of larger size.

20. The process of treating fuller's earth which comprises roasting a mixture of dry fine earth with a dry relatively coarse earth of which the particles are in discreet or separated condition, in the presence of an abundance of air, with agitation.

In testimony whereof I have signed my name to this specification.

GEORGE GLEN BROCKWAY.